(12) United States Patent
Inman et al.

(10) Patent No.: US 6,755,011 B1
(45) Date of Patent: Jun. 29, 2004

(54) REMOVABLE FEED TABLE FOR BAGGING MACHINE

(75) Inventors: Larry R. Inman, Astoria, OR (US); Michael H. Koskela, Astoria, OR (US)

(73) Assignee: Ag-Bag International Limited, Warrenton, OR (US)

( * ) Notice: Subject to any disclaimer, the term of this patent is extended or adjusted under 35 U.S.C. 154(b) by 0 days.

(21) Appl. No.: 10/439,452

(22) Filed: May 16, 2003

(51) Int. Cl.[7] ............................................. B65B 43/26
(52) U.S. Cl. ........................... 53/459; 53/523; 53/527; 53/530; 53/167; 53/567; 53/576
(58) Field of Search ...................... 53/459, 523, 527, 53/529, 530, 167, 567, 576; 241/101.76; 414/353, 381, 386; 141/231, 232, 129; 100/65, 100, 189

(56) References Cited

U.S. PATENT DOCUMENTS

| | | | | |
|---|---|---|---|---|
| 3,439,820 A | * | 4/1969 | Miklos | 414/499 |
| 3,489,300 A | * | 1/1970 | McCartney et al. | 414/351 |
| 3,688,926 A | * | 9/1972 | Stefanelli | 414/353 |
| 3,818,955 A | * | 6/1974 | Kline | 141/12 |
| 4,348,150 A | * | 9/1982 | Inghram et al. | 414/529 |
| 4,567,820 A | * | 2/1986 | Munsell | 100/65 |
| 4,904,144 A | * | 2/1990 | Phillips | 414/383 |
| 4,949,633 A | * | 8/1990 | Johnson et al. | 100/65 |
| 5,230,475 A | * | 7/1993 | Gerner | 241/34 |
| 5,367,860 A | * | 11/1994 | Cullen | 53/576 |
| 5,458,451 A | * | 10/1995 | Bratlie et al. | 414/385 |
| 5,580,134 A | * | 12/1996 | Allwine | 298/11 |
| 5,784,865 A | * | 7/1998 | Cullen | 53/567 |
| 6,305,625 B1 | * | 10/2001 | Talamantez et al. | 241/101.71 |
| 6,430,897 B1 | * | 8/2002 | Cameron et al. | 53/436 |
| 6,527,209 B1 | * | 3/2003 | Dorscht | 241/101.2 |
| 6,672,034 B1 | * | 1/2004 | Wingert | 53/439 |

* cited by examiner

Primary Examiner—Stephen F. Gerrity
Assistant Examiner—Hemant M. Desai
(74) Attorney, Agent, or Firm—Schwabe, Williamson & Wyatt, P.C.

(57) ABSTRACT

A feed table can be used to convey agricultural material into a bagging machine. The feed table can be removed from the bagging machine so that the feed table can be separately transported. The feed table includes an attachment mechanism to detachably couple the feed table to the bagging machine, a mobility support mechanism to at least partially support the feed table when the feed table is not attached to the bagging machine, and a tow mechanism to detachably couple the feed table to a towing vehicle.

15 Claims, 3 Drawing Sheets

REMOVABLE FEED TABLE FOR BAGGING MACHINE

FIELD OF THE INVENTION

The present invention relates to the field of agricultural machinery. More specifically, the present invention relates to a removable feed table for feeding agricultural material, such as silage, into a bagging machine.

BACKGROUND

A bagging machine can be used to store any of a variety of agricultural materials, such as silage, in large bags. The bags are often made of plastic that is designed to preserve the stored material. The bags can be several feet in diameter and several hundred feet long. For example, a commonly used bag has a 12 foot diameter and is 500 feet long.

A bagging machine is usually self-propelled, with a feed table extending from the front end and a bag dispenser extending from the back end. When agricultural material is dumped on the feed table, the feed table conveys the material to a rotor inside the bagging machine. The rotor propels the material through the bagging machine and the bag dispenser. The bag dispenser holds the mouth of the bag open to collect the stream of material in the bag. When a bag is first being filled, the majority of the length of the bag is stored within the bag dispenser. But, as the material accumulates in the bag, the bagging machine moves forward and the dispenser dispenses more of the bag so that the bag is laid out on its side.

Vast quantities of agricultural material can be stored in bags using this process. The material is usually dumped onto the feed table from a truck. Unfortunately, the feed table can be a bottle neck in the bagging process. If the feed table only holds a small fraction of a truck load of material, a truck can only dump a relatively small amount at a time, requiring the truck to gradually move forward as the bagging machine moves forward and fills the bag. Also, if the feed table only holds enough material to feed the bagging machine for a short period of time, there may not be enough time to switch an empty truck for a loaded truck while sustaining continuous bagging. In other words, the bagging machine may have to stop between trucks loads.

Unfortunately, the size and length of a feed table on a bagging machine is often limited by practical considerations. For instance, in order to move the bagging machine from one bagging site to another, the bagging machine is likely to travel over public roads. In which case, a long, protruding feed table can be cumbersome and even dangerous.

BRIEF DESCRIPTION OF DRAWINGS

Examples of the present invention are illustrated in the accompanying drawings. The accompanying drawings, however, do not limit the scope of the present invention. Similar references in the drawings indicate similar elements.

DETAILED DESCRIPTION OF THE INVENTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternative embodiments. In other instances, well known methods, procedures, components, and circuits have not been described in detail. Parts of the description will be presented using terminology commonly employed by those skilled in the art to convey the substance of their work to others skilled in the art. Lastly, repeated usage of the phrase "in one embodiment" does not necessarily refer to the same embodiment, although it may.

Embodiments of the present invention comprise a removable feed table for an agricultural bagging machine that can be separately transported from one bagging site to another. By separately transporting the feed table, the feed table can be much longer and/or wider than prior feed tables, allowing more agricultural material to be unloaded or "staged" at one time. Trucks can unload and move away faster and/or there can be more time between truck loads.

Various embodiments of the present invention include a variety of features for quick and convenient attaching and detaching of the feed table to a bagging machine, for quick and convenient attaching and detaching of the feed table to a towing vehicle for travel from one bagging site to another, for moving the bagging machine with the feed table attached from one bag to another at a given bagging site, for conveying large volumes of material on the feed table, and the like.

Figure 1:
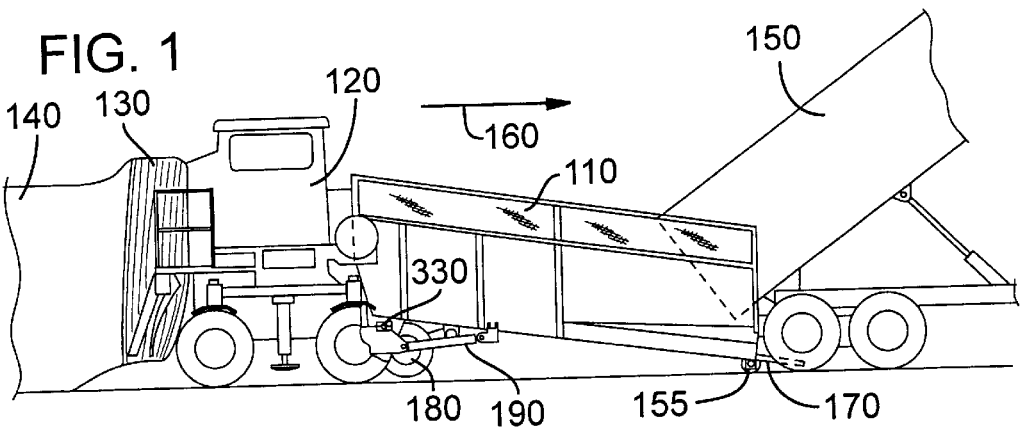
FIG. 1 illustrates one embodiment of a removable feed table in a bagging mode.

FIG. 1 illustrates one embodiment of a removable feed table 110 in a bagging mode. The feed table is attached to a bagging machine 120. A truck 150 dumps material onto feed table 110. Feed table 110 conveys the material to bagging machine 120. Bagging machine 120 includes a rotor (not shown) to propel the material through the bagging machine and bag dispenser 130. Bag dispenser 130 holds bag 140 open to collect the material and to dispense more of bag 140 as bagging machine 120, feed table 110, and truck 150 gradually move in direction 160, trailing bag 140 behind. A skid 155 prevents feed table 110 from digging into the ground as material is dumped on the feed table. FIG. 1 also illustrates tow tongue 170, air actuated axle 180, and lift cylinder 190, all of which are described in more detail below. In one embodiment, feed table 110 is between 10 and 14 feet wide and 20 and 30 feet long.

Figure 2:
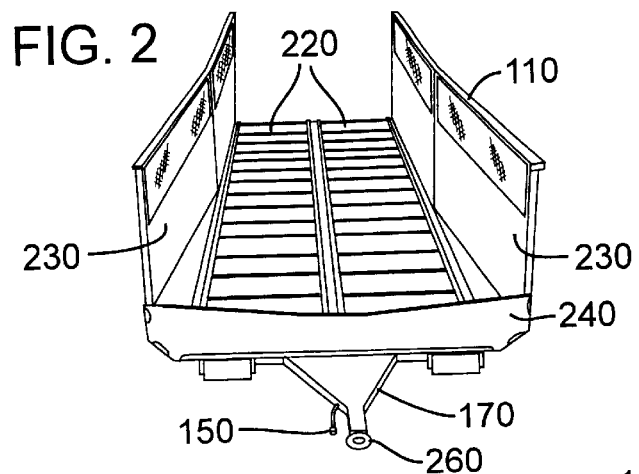
FIG. 2 illustrates one embodiment of the interior of a removable feed table.

FIG. 2 illustrates another view of the removable feed table 110 looking from the end of the table where material is dumped toward the end of the table where the bagging machine (not shown) is attached. In the illustrated embodiment, the feed table includes double chain conveyors 220. The feed table also includes flared front panels 230 to provide a wider area to receive the dumped material. A dam 240 prevents some material from overflowing the front of the feed table as the material is dumped. Tow tongue 170 is located near the center of the feed table. In the illustrated embodiment, tongue 170 includes a pintle hitch 260 and a quick attach control line 250 for travel lights, air brakes, and the like. The control lines 250 can be coupled to matching control lines on a tow vehicle, such as truck 150 from FIG. 1.

Figure 3:
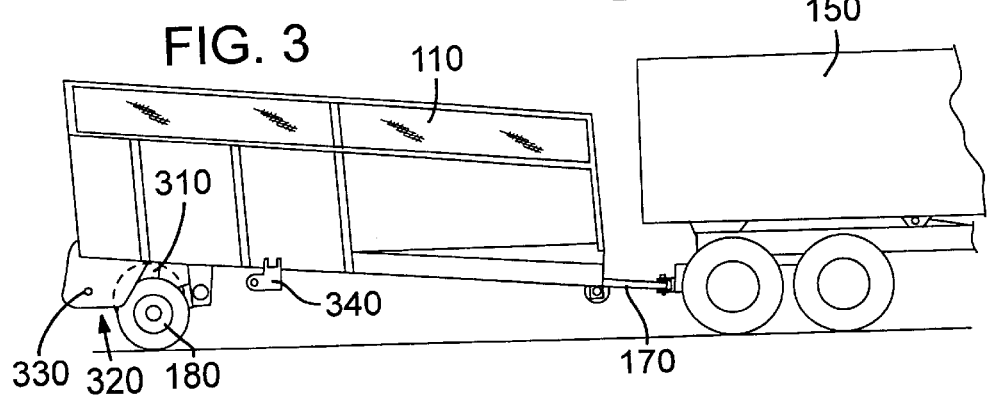
FIG. 3 illustrates one embodiment of a removable feed table in a travel mode.

FIG. 3 illustrates the feed table 110 in a travel mode. A tow vehicle, such as truck 150 is hitched to tow tongue 170. Air actuated axle 180 is in a down position to support feed table 110 while it is being towed. When the feed table is used in the bagging mode, as shown in FIG. 1, an air actuator 310 can actuate and lift axle 180 in direction 320 so that the axle is up and out of the way during bagging. FIG. 3 also illustrates mounting pins 330 and lift receivers 340, both of which are described in more detail below.

Figure 4:
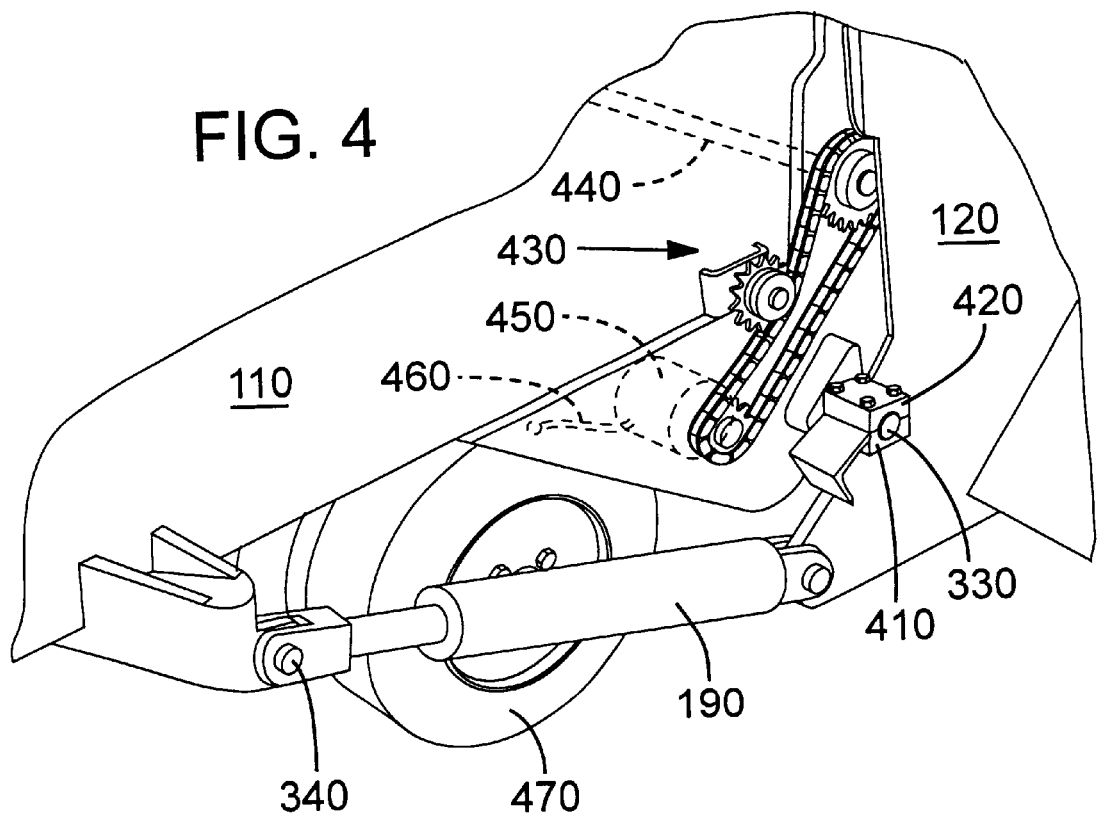
FIG. 4 illustrates one embodiment of a mounting pin, a sprocket assembly, and a lift cylinder attachment.

FIG. 4 illustrates a close-up of feed table 110 where it attaches to bagging machine 120. Mounting pin 330 is cylindrical with a diameter designed to fit a receiver 410 on bagging machine 120. A locking plate 420 bolts over mounting pin 330 to secure the pin. The cylindrical shape allows the feed table to pivot up and down on the pin 330 relative to the bagging machine. Another mounting pin, receiver, and receiver plate (not shown) are located on the opposite side of the feed table to similarly couple the feed table with the bagging machine.

Also shown in FIG. 4 is a sprocket assembly 430 to drive one or both of the chain conveyors (not shown) inside feed table 110. If the chain and sprocket assemble drive only one of the chain conveyors, a similar assembly can be located on the opposite side of the feed table to drive the other chain conveyor.

A chain driver 450 is located on feed table 110 inboard of the assembly 430 to drive the assembly. Assembly 430, in turn, drives conveyor axle 440 which turns one or both chain conveyors (not shown). Chain driver 450 includes a control line 460 that can be detachably coupled to a control line (not shown) from the bagging machine (not shown) to power the chain driver 450. In an alternative embodiment, a power take-off (PTO) from the bagging machine can be used to drive the sprocket assembly.

Also shown in FIG. 4 is a close-up of lift receiver 340. As discussed above, pin 330 pivotally couples feed table 110 to bagging machine 120. Lift cylinder 190 is coupled between bagging machine 120 and lift receiver 340. Another lift cylinder (not shown) is similarly attached on the opposite side of the feed table 110. The pair of lift cylinders 190 can pivot feed table 110 to lift the end opposite the bagging machine to, for instance, move from one bag to another without pushing the feed table along the ground.

Figure 5:
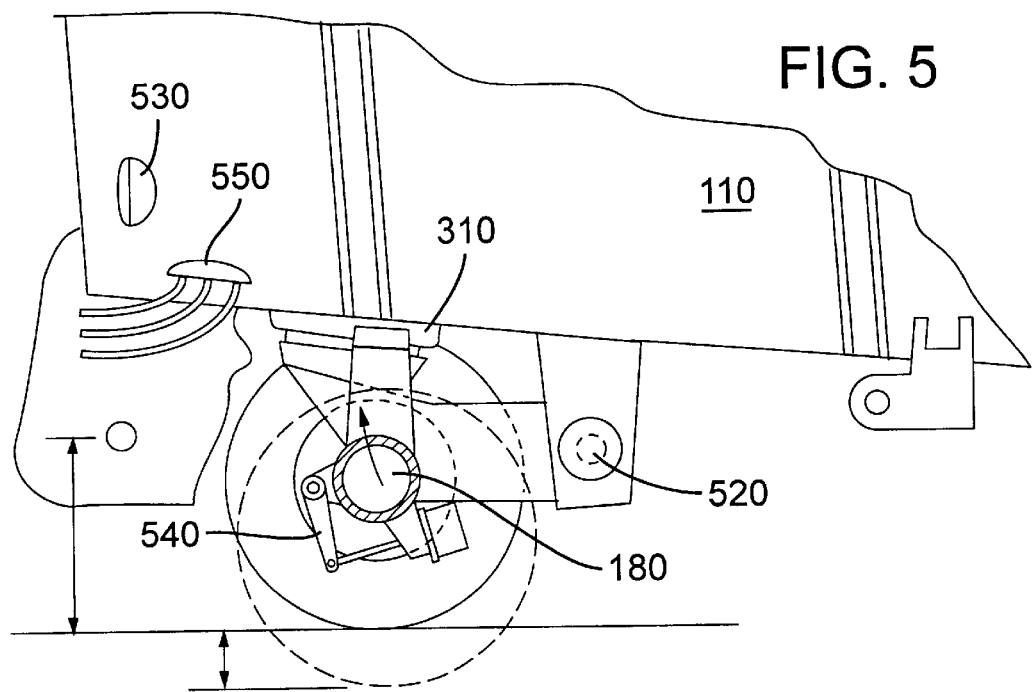
FIG. 5 illustrates one embodiment of an air actuated axle in a lowered position.
Figure 6:
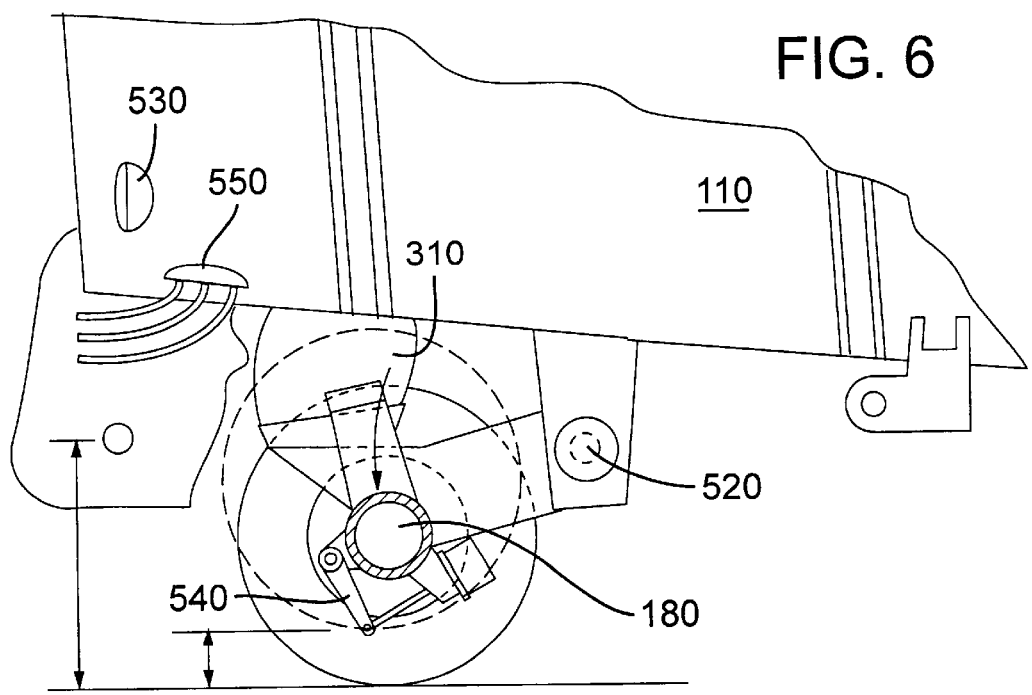
FIG. 6 illustrates one embodiment of the air actuated axle in a raised position.

FIGS. 5 and 6 illustrate air actuated axle 180 in more detail. FIG. 5 illustrates the feed table in a lowered position, as might be used for the bagging mode. FIG. 6 illustrates the feed table in a raised position, as might be used for the travel mode. Axle 180 is coupled to feed table 110 by hinges 520. Air actuator 310 can rotate axle 180 up and down about the hinges 520. FIGS. 5 and 6 also illustrate travel lights 530 and air brakes 540. A set of quick attach control lines 550 can be used to couple these and various other systems on feed table 110 to bagging machine 120 when in bagging mode.

One way to attach the feed table to the bagging machine is to align the feed table mounting pins with the bagging machine receivers by maneuvering a tow vehicle and/or the bagging machine. This can be done with the feed table in the travel mode, with the axle in the down position to raise the feed table. Once the pins on the feed table are aligned with the receivers on the bagging machine, the axle's air actuator can lift the axle, causing the feed table to lower and allowing the pins to drop into the receivers. Then, the pins can be bolted in place and the lift cylinders can be attached. Using the lift cylinders, the feed table can be lifted slightly to remove weight from the tongue so that the tow vehicle can be detached. Control lines for air brakes, lights, and possibly the axle's air actuator can be decoupled from the tow vehicle, and control lines for the chain driver and possibly the lift cylinders and air actuator can be coupled to the bagging machine. At this point, the feed table is in the bagging mode. To switch back to the travel mode, the reverse process can be used.

Alternative embodiments may use any of a variety of mechanisms to support the feed table during travel, move the support mechanism out of the way in bagging mode, couple the feed table to the bagging machine, couple the feed table to a tow vehicle, lift the feed table when in bagging mode, control the various system on and around the feed table, and the like.

Thus, a removable feed table is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. An apparatus comprising:
   a feed table to convey agricultural material into a bagging machine when the feed table is in a bagging mode;
   an attachment mechanism to detachably couple the feed table to the bagging machine;
   a mobility support mechanism to at least partially support the feed table when the feed table is in a travel mode and detached from the bagging machine; and
   a tow mechanism to detachably couple the feed table to a towing vehicle in the travel mode.

2. The apparatus of claim 1 wherein the feed table comprises:
   a double chain conveyer.

3. The apparatus of claim 1 wherein the feed table comprises:
   a pair of flared front panels.

4. The apparatus of claim 1 wherein the feed table is between 10 and 14 feet wide and between 20 and 30 feet long.

5. The apparatus of claim 1 wherein the attachment mechanism comprises:
   a pair of cylindrical pins, one extending from each side of the feed table near an end of the feed table that attaches to the bagging machine, said pair of cylindrical pins having a radius designed to fit matching cylindrical receivers on the bagging machine.

6. The apparatus of claim 1 wherein the mobility support mechanism comprises:
   a wheeled axle.

7. The apparatus of claim 1 wherein the mobility support mechanism comprises:
   an actuating device to lift the mobility support when in the bagging mode and to lower the mobility support mechanism when in the travel mode.

8. The apparatus of claim 7 wherein the actuating device comprises an air actuator.

9. The apparatus of claim 1 wherein the tow mechanism comprises a pintle hitch.

10. The apparatus of claim 1 further comprising at least one of:

trailoring lights coupled to the feed table;

airbrakes for the mobility support mechanism;

an actuator for the mobility support mechanism;

a conveyor driver for the feed table; and a plurality of quick attach control lines for at least one of the lights, the airbrakes, the actuator, and the conveyor driver.

11. The apparatus of claim 1 further comprising:

a lift mechanism to raise and lower an end of the feed table opposite the bagging machine when in the bagging mode.

12. The apparatus of claim 11 wherein the lift mechanism comprises:

a pair of lift cylinders to couple between the bagging machine and the feed table.

13. The apparatus of claim 1 further comprising:

a skid coupled to the bottom of the feed table near an end of the feed table opposite the bagging machine when in the bagging mode.

14. A method of attaching a removable feed table to a bagging machine, the method comprising:

attaching an attachment mechanism of the removable feed table to a receiver mechanism of the bagging machine;

actuating a mobility support mechanism of the removable feed table to an up position;

coupling a lift mechanism from the bagging machine to the removable feed table;

partially lifting the removable feed table using the lift mechanism; and decoupling a tow mechanism of the removable feed table from a tow vehicle.

15. The method of claim 14 further comprising:

coupling a plurality of quick attach control lines between the bagging machine and the removable feed table.

\* \* \* \* \*